United States Patent Office 2,982,555
Patented May 2, 1961

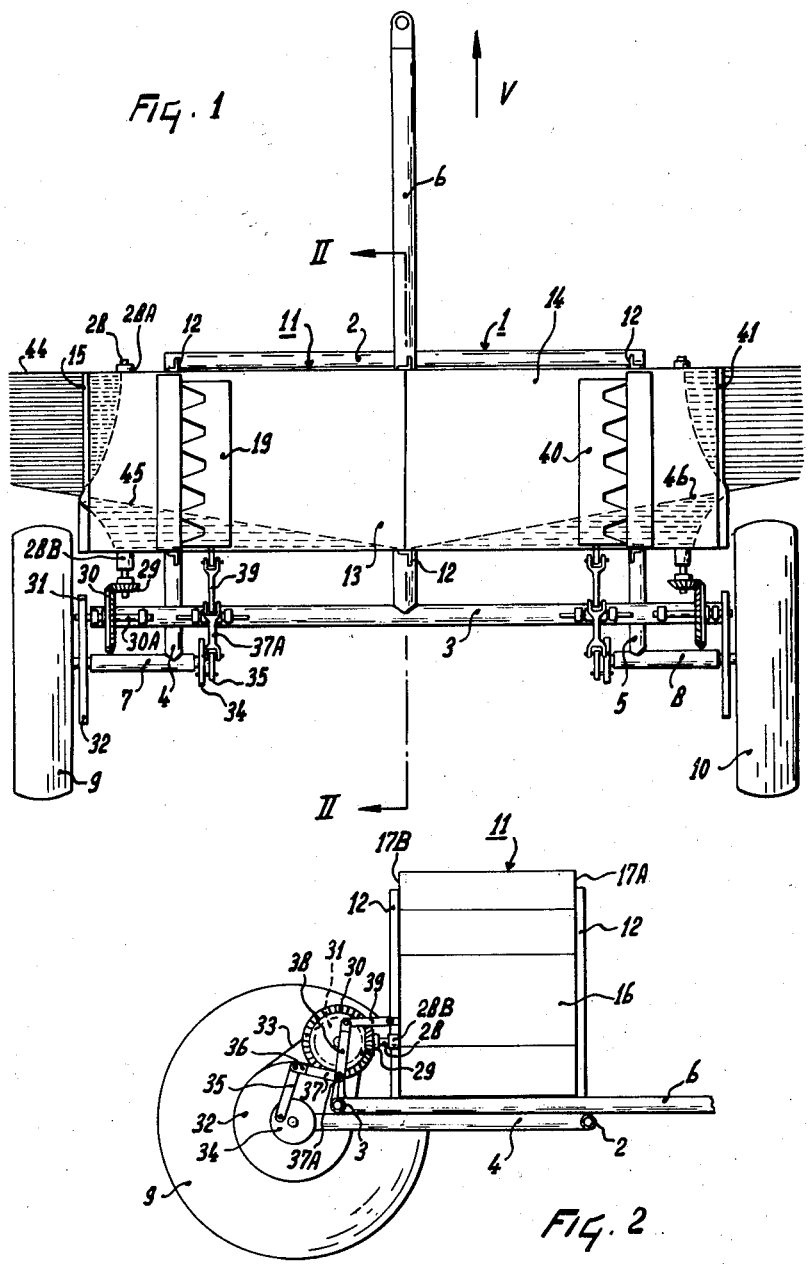

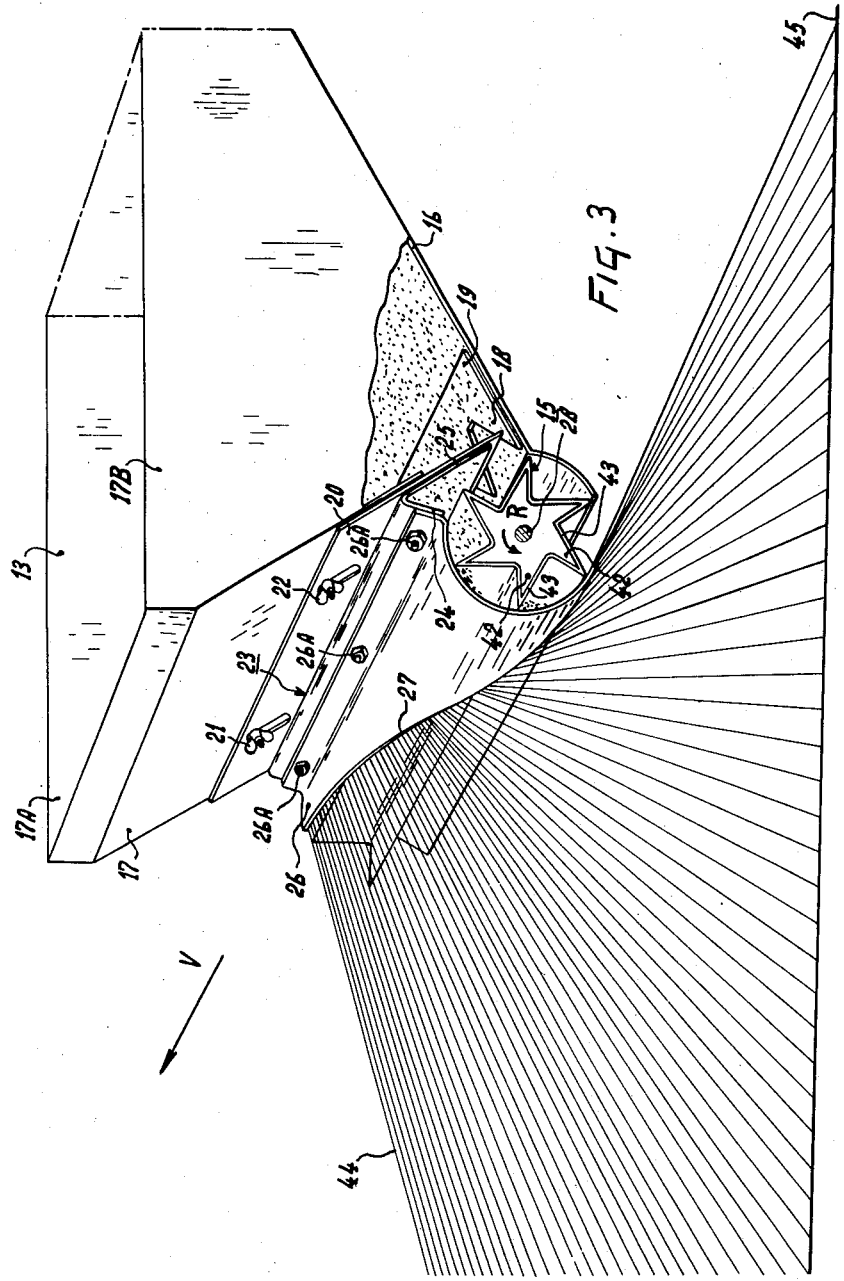

2,982,555

DEVICES FOR SPREADING GRANULAR OR POWDERY MATERIAL OVER A SURFACE

Cornelis van der Lely and Ary van der Lely, Maasland, Netherlands, assignors to C. van der Lely, N.V. Manufacturers, Maasland, Netherlands, a Dutch limited company of Netherlands Filed Aug. 19, 1957, Ser. No. 678,925

Claims priority, application Netherlands Aug. 21, 1956

11 Claims. (Cl. 275—8)

The invention relates to a device for spreading granular or powdery material over a surface, this device comprising a rotating caster or thrower member, which is surrounded over part of its periphery by a screening hood.

Devices of this kind are generally known, in which the caster member is constituted by a horizontal plate provided with ridges and rotatable about a vertical axis, a screening plate being provided on the front side of the caster member in order to prevent the material to be spread from being cast against the vehicle or the draft animal propelling the device. With these devices the direction in which the material is spread from the caster member cannot be controlled; the distribution of the material over the surface can only be controlled by controlling the supply of the material to the caster member in a particular manner at a given place. As a matter of course, this will not provide a satisfactory distribution.

The invention has for its object to provide a device of the aforesaid kind, which can provide a satisfactory distribution of the material over the surface, whilst the spreading can take place in a simple manner.

In accordance with the invention the axis of the caster member is disposed to lie substantially parallel to the surface and the screening hood is provided with a spreading edge, along which the material to be spread is conducted away by the caster member, the circumferential position of the spreading edge of the screening hood around the periphery of the caster member viewing along the axis of the caster member. It is thus ensured that the material can leave the caster member in different directions radially from the caster member. The spreading edge may be chosen to be such that the material is distributed evenly over the surface, whilst, it can at the same time be spread over a large width.

It is preferred that the axis of the caster member should extend in the direction of travel. Thus the material is spread over a surface width which is substantially larger than the width of the device.

It may furthermore be desirable to arrange the screening hood mainly on the upper side of the caster member, so that the material is spread downwardly. Thus, during the spreading operation, the effect of wind and force of gravity on the material is minimized, which is highly conducive to a uniform distribution of the material over the surface.

The spreading edge is preferably shaped in a form such that the material is spread in directions extending on either side of the vertical plane going through the axis of the caster member. This has the advantage that the distance over which the material is to be cast can be reduced to a minimum, whilst it is at the same time possible to distribute the material below the device.

The largest distances over which the material is to be spread on either side of the vertical plane going through the axis of the caster member may differ from one another. Thus the width of the strip over which the material is spread may be varied, whilst, moreover, the position of the strip with respect to the device can be varied.

The caster member may be in open communication through part of the periphery, with a space (eddy chamber), in which the material is kept whirling and out of which the material to be spread is supplied constantly back to the caster member. Thus, in spite of the fact that the material may be supplied to this space in an uneven manner by the caster member, a quite regular, constant transport of material out of this space back to the caster member is obtained, so that the distribution on the ground may be quite uniform.

A further advantage thereof is that, since the material is supplied to the eddy chamber by means of the caster member, this chamber can serve at the same time to whirl the material in the eddy chamber, so that the simplest and cheapest possible construction is obtained.

The invention will be described more fully with reference to a few embodiments.

Figure 1 is a plan view of a device according to the invention.

Figure 2 is a sectional view taken on the line II—II of Figure 1.

Figure 3 is a perspective view of a detail of the device shown in Figures 1 and 2.

Figure 4:
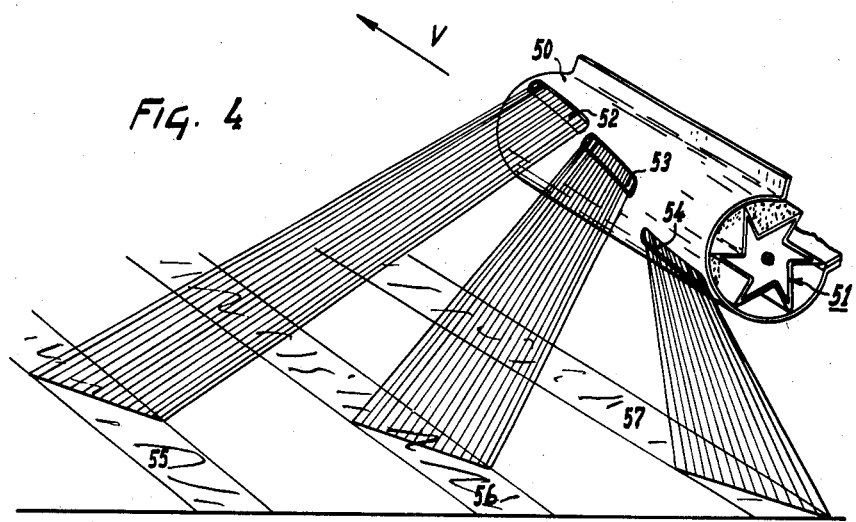
Figure 4 show a modified detail of Figure 3.

As is shown in the figures the device comprises a frame 1, which has two parallel frame tubes 2 and 3, which are connected with one another by two parallel tubes 4 and 5. To the tubes 2 and 3 is secured a draw rod 6. To the tubes 4 and 5 are secured bearings 7 and 8, which are aligned with one another. The frame is supported by running wheels 9 and 10, the axles of which are rotatable in the bearings 7 and 8. On the frame 1 a container 11 is mounted by means of angular iron strips such as 12. The container 11 has two sections 13 and 14. As is shown in Figure 3 the lower side of the section 13 of the container 11 is formed by a bottom 16 and a side wall 17, both of which occupy slanting positions. The bottom 16 and the side wall 17 are connected with one another by side walls 17A and 17B. On the lower side of the container section 13 is arranged a caster or thrower member 15, which is star-shaped in section, and which comprises a horizontal shaft 28, extending in the direction of travel, and blades 42, extending in an axial direction. The blades 42 have sides 43, which are parallel to the shaft 28.

Between the lower side of the wall 17 and the bottom 16 an opening 18 is left, through which the material can be supplied from the container to the caster member 15. Over the bottom 16 is mounted a supply member 19 of known sawtooth construction, which supplies the material to the caster member through the opening 18 during its rocking movement. On the lower side of the side wall 17 is mounted a slide 20, which is adjustable in the direction of height and which can be fixed by means of wing nuts 21 and 22. The size of the opening 18 can be controlled by means of the slide 20. Near the opening 18, on the outer side of the container section 13, is a curved plate 23, the two sides of which are designated by 24 and 25. This curved plate, together with part of the periphery of the caster member 15, forms a substantially closed space (the eddy chamber), which is only open at the opening 18, through which the material can be supplied to this space. To the curved plate 23 is secured a screening hood 26 by means of three bolts 26A. The screening hood or shield 26 extends over part of the periphery of the caster member 15 and is provided with a spreading edge 27. The spreading edge 27 extends in a spiral along the periphery of the caster member, i.e. from the top side on one side of the caster member to the lower end on the other side of the caster member. The shaft 28 is journalled in bearings 28A and 28B and provided at one end with a conical gear wheel 29, which is driven by a conical gear wheel 30. The conical gear wheel 30, which is seated on an intermediate shaft 30A, is driven from the running wheel 9 by means of a chain transmission comprising sprockets 31 and 32 and a chain 33. The rocking movement of the supply member 19 is also obtained from the running wheel 9. To the axle of the running wheel 9 is secured a disc 34, to which a connecting rod 35 is secured. The connecting rod 35 is linked with an arm 36 of a tumbler 37, which is rotatable about a shaft 37a. The tumbler or bell crank 37 has an arm 38, which is linked by means of a rod 39 with the supply member 19. In the same manner as described for the section 13 of the container 11, the section 14 is provided with a supply member 40 and a caster member 41.

The device operates as follows: during the movement in the direction V the supply members 19 and 40 will perform a rocking movement and the caster members 15 and 41 will rotate. The caster members 15 and 41 will rotate in a manner such that their top sides will move towards the outer side of the device, so that the caster member 15 will rotate in the direction of the arrow R. The movements of the supply members are performed only slowly; at each revolution of the running wheel the associated supply member performs a single travel to and fro. Thus the supply member 19 supplies material periodically out of the container 11. As a matter of course, the supply provided by the caster member must be much more regular. To this end the material is supplied from the container to the caster member 15. The caster member will cast the material into the space formed by the curved plate 23, the material thus touching the walls 25 and 24 and being thus whirled around in this space. Consequently, in this eddy chamber a quantity of material is stored. From this space a constant, growing quantity of material will find its way back to the spaces between the blades or rib members 42, which catch the material in their rotary motion. Consequently, the periodical supply away from the container is changed in the eddy chamber into a constant supply to the caster member.

Owing to the rotary motion of the caster member 15 the material contained between the blades 42 will be transported by centrifugal force towards the outer periphery of the caster member 15, so that it reaches the screening hood 26. Where the screening hood 26 terminates, the material will be flung out by the sides such as 43 of the blades 42 in a direction which coincides substantially with the direction of the axis of the caster member. Since the screening hood 26 engages around the periphery of the caster member 15 for variable amounts along the length of this caster member, the material provided over the length of the caster member 15 between the blades such as 42 will be spread in different directions with respect to the caster member. The shape of the spreading edge 27 determines the distance over which the screening hood 26 engages the periphery of the caster member 15. By the choice of the form of the spreading edge 27, the direction in which the material is spread in a plane at right angles to the shaft 28 of the caster member can be determined.

In accordance with the embodiment, viewed in the direction of travel, the front part of the screen hood 26 engages around only a small part of the periphery of the caster member 15, so that the material at the front end of the caster member between the blades 42 is spread in the direction of the line 44 and falls on the ground at a large distance to the side of the device. Towards the rear side the screening hood 26 engages around a greater part of the periphery of the caster member 15, so that the material located between the blades 42 at different positions about the length of the caster member 15, going towards the rear, is spread in different directions, the material at first falling on the ground at points nearer the device. Near the rear end the screening hood 26 is curved around the caster member 15 to an extent such that the material is spread at first below the caster member and over one or two sides of it so that the material falls on the ground on either side of the vertical plane going through the shaft 28. By the choice of the spreading edge 27 as shown, the material falls on the ground in a straight line 45, whilst it is distributed evenly along this line.

Since the screening hood 26 is arranged mainly at the top end of the caster member 15, the material is spread always downwardly, so that during the spreading operation the material is substantially not affected by the wind or the force of gravity.

The material spread by the caster member 41 will be distributed in the same manner as the material spread by the caster member 15 over the ground along the line 46.

Since the screening hood 26 is fastened only by means of three bolts, it can be readily detached to clean the device.

The screening hood 26 may be shaped in a different form, so that it is possible to have the spreading completely match the prevailing circumstances.

As is shown in Figure 4 a screening hood 50 is curved completely around a caster member 51, the spreading edge being formed by three elongated openings 52, 53 and 54. By the correct form of these openings in the screening hood the material is spread over the surface in strips 55, 56 and 57.

Figure 5:
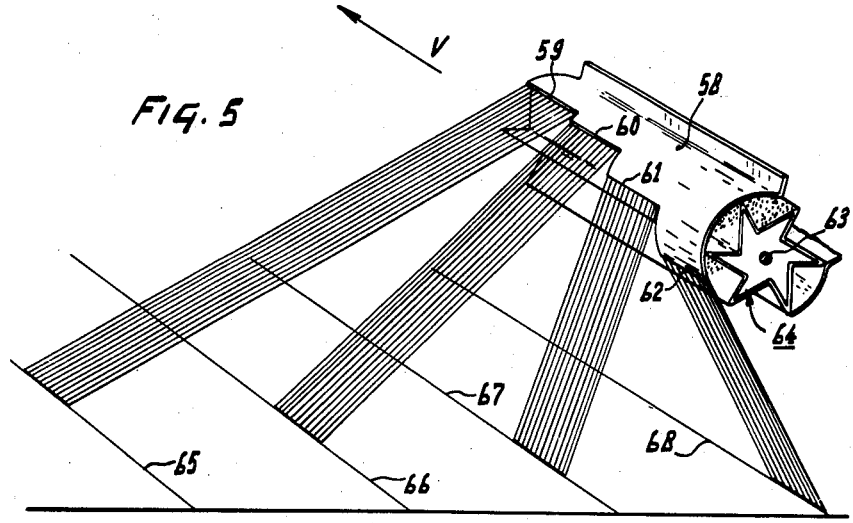
Figure 5 shows a further modified detail of Figure 3.

As is shown in Figure 5 a screening hood 58 is provided with a spreading edge which consists of four parts 59, 60, 61 and 62, which extend parallel to the shaft 63 of the caster member 64. With this shape the material is spread over a surface along four lines 65 to 68.

What we claim is:

1. A spreader comprising a source of particles having a discharge opening, rotary means adjacent said opening for receiving particles from the source, and a hood adjacent the opening and rotary means for partially restricting the movement of particles away from the rotary means, said hood defining a chamber adjacent the discharge opening for accumulating particles and constituting an eddy chamber, said hood further extending in part around said rotary means and having an edge spaced from said eddy chamber.

2. A spreader comprising a mobile hopper for accommodating particles of material to be spread, the hopper defining a discharge opening for the gravitational discharge of the particles and having a determinable direction of travel, a shaft supported on the hopper adjacent said opening and extending at an angle of other than ninety degrees relative to said direction, a device on the shaft for rotation and including rib members extending away from the shaft, said device receiving particles discharged from the hopper and imparting a movement to the particles away from the shaft, a member on the hopper defining an eddy chamber adjacent said device and said discharge opening for the accumulation of particles, and a shield on said member and extending along said device and peripherally around the same at least in part, the shield defining a discharge zone for the particles, said zone having an angular relationship to the shaft varying along said shaft whereby the particles are discharged in different directions.

3. A spreader as claimed in claim 2 wherein the eddy chamber is positioned above the discharge opening.

4. A spreader as claimed in claim 2 wherein the shaft is parallel to said direction.

5. A spreader as claimed in claim 2 wherein said device includes sides parallel and radially disposed with respect to said shaft and defining a star-shaped cross-section.

6. A spreader as claimed in claim 2 wherein the shield has a spiral-shaped edge.

7. A spreader as claimed in claim 2 wherein the shield defines a spiral arrangement of slots.

8. A spreader as claimed in claim 2 comprising means for controllably varying the discharge opening.

9. A spreader as claimed in claim 2 wherein the shield extends around said device on both sides of a vertical plane through said shaft.

10. A spreader as claimed in claim 2 wherein the eddy chamber extends below the highest point of said device.

11. A spreader comprising a mobile source of particles, said source having a determinable direction of travel and defining a discharge opening, a rotatable device adjacent the opening and defining an at least substantially horizontal axis of rotation making an angle other than ninety degrees with said direction, said device receiving particles from the source and including means for flinging the particles away from said axis, and a shield surrounding said device in part defining a discharge zone lying around a cylinder described by the outer ends of said device, said zone having an angular relationship to the device varying along said axis of rotation whereby the particles are discharged in different directions.

References Cited in the file of this patent

UNITED STATES PATENTS

| | | |
|---|---|---|
| 1,464,621 | Kemp | Aug. 14, 1923 |
| 2,350,476 | Richey | June 6, 1944 |
| 2,430,020 | Johnson | Nov. 4, 1947 |
| 2,602,670 | Burkart | July 8, 1952 |
| 2,665,135 | Harper | Jan. 5, 1954 |
| 2,758,841 | Larsson | Aug. 14, 1956 |

FOREIGN PATENTS

| | | |
|---|---|---|
| 1,060,948 | France | Nov. 25, 1953 |
| 438,094 | Germany | Dec. 7, 1926 |
| 925,862 | Germany | Mar. 31, 1955 |
| 348,190 | Great Britain | May 11, 1931 |